Figure 1:
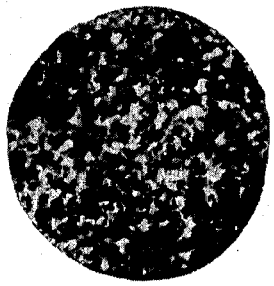

Aug. 17, 1965     P. J. SCHERBNER ETAL     3,201,234
ALLOY AND METHOD OF PRODUCING THE SAME
Filed Sept. 25, 1961     5 Sheets-Sheet 1

Inventors
PAUL J. SCHERBNER &
ROBERT E. SAXTAN

Attorneys 3,201,234
ALLOY AND METHOD OF PRODUCING
THE SAME
Paul Joseph Scherbner, Boyertown, and Robert Eugene Saxtan, Reading, Pa., assignors to The Beryllium Corporation, Reading, Pa., a corporation of Delaware
Filed Sept. 25, 1961, Ser. No. 140,563
10 Claims. (Cl. 75—153)

This invention relates generally to improvements in alloys and is directed particularly to new grain refined copper base alloys and methods of producing the same.

Brasses and other copper base alloys generally form coarse grained castings and ingots. This is a condition which is highly unsatisfactory, since the rolling or forging of such castings and ingots or billets cannot be satisfactorily carried out, whereas fineness of grain in the structure greatly increases the mechanical properties of the same, making for the production of a better machine finish; improved hot rolling characteristics and hot forging characteristics and improvements in the polishing characteristics of the metal.

Due to process limitations it has not been possible heretofore, in many cases, to obtain a desirable fine grained cast brass or other copper base alloy structure. It is accordingly obvious that, for the making of castings which are to be used in their cast state, i.e., are not to be hot or cold worked although they may be thermally treated and machined, improvement in mechanical properties of such alloys will result from a decrease in grain size. Such an improvement is especially important where high strength castings with varying section thicknesses are required. Such improvement in grain size is also important where large and heavy walled castings are required to meet high mechanical property specifications.

It is a particular object of the present invention to provide new copper base alloys and methods of producing the same, which alloys contain intermetallic compounds of titanium and cobalt as nuclei of the grains or crystals thereof, resulting in the formation of grain structures of materially greater fineness than have been heretofore produced without the addition. Accordingly, billets of such alloys have improved forgability and are not prone to rupture during forging operations and, also, in other hot working operations, such as hot rolling, material of a high quality will be produced.

It is also an object of the present invention to provide a new copper base alloy which when introduced into a mold, will form a molded ingot free of pits resulting from steam formation between the alloy and the mold.

Brasses and other copper base alloys, prepared in accordance with the present invention, form billets or castings having a fine grained equiaxed structure. This result is obtained by the introduction into the melt of cobalt and titanium in such quantity as to produce intermetallic compounds of these two metals throughout the melt.

When cobalt and titanium are introduced into copper base alloy melts in the proper amounts in accordance with the present invention to give a certain excess of cobalt therein, metallic compounds produced are of such a nature as to precipitate out of solution during solidification of the alloy, in sufficient quantity and size to provide a large number of nuclei to initiate grain formation. It has also been found that three of the intermetallic compounds of these two elements, or a combination of the three intermetallic compounds, have the ability to refine the grain size of many copper base alloys. The three intermetallic compounds referred to have been identified by X-ray diffraction methods to be TiCo, $Ti_2Co$ and $TiCo_2$.

In carrying out the present invention a convenient and satisfactory method of introducing the titanium in a cobalt-containing alloy or of introducing desired quantities of cobalt and titanium together in a selected alloy heat, in the proper proportions to obtain the desired intermetallic compound, may be by means of the employment of master alloys.

In the accompanying drawings the various figures set forth will be hereinafter particularly referred to in connection with the description of the invention as the description proceeds.

While various suitable master alloys containing the titanium and cobalt may be employed for introducing these substances into different alloys, one example of such a master alloy which has been employed as hereinafter set forth comprises the following ingredients in the approximate proportions set forth:

|  | Percent |
|---|---|
| Titanium | 5 |
| Beryllium | 4 |
| Cobalt | 2.5 |
| Copper | 88.5 |

The foregoing master alloy was added to a number of copper base alloys in the proper proportions to impart thereto approximately .10% titanium, .10% cobalt and .10% beryllium, with definite refinement of grain structure in the resultant cast billets.

For example, the master alloy was added to a cartridge brass alloy comprising 70% copper and 30% zinc, in the proper amount to give the above percentages of titanium, cobalt and beryllium.

Figure 2:
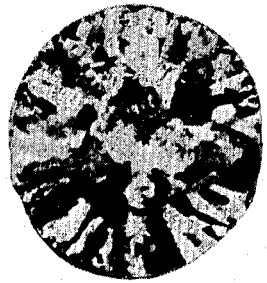

FIG. 1 of the drawings illustrates the character of the grain structure resulting from the addition of these master alloy ingredients to the cartridge brass, while FIG. 2 shows the grain form of a billet cast from the same cartridge brass before the addition of the master alloy to the melt. The heats for the billets shown in FIG. 1 and FIG. 2 were poured at the same temperature. It will be obvious that the grain structure shown in FIG. 1 is greatly refined over that shown in FIG. 2.

The proper amount of the master alloy was also added to other copper base alloys such as those set forth hereinbelow, to introduce the same percentages of titanium, cobalt and beryllium as set forth in connection with the cartridge brass composition:

85% copper—5% tin, 5% zinc, 5% lead
85% copper—11% aluminum, 4% iron
80% copper—10% tin, 10% lead In each case the addition of the master alloy to the different copper base alloys gave similar results to those obtained with the addition of the master to the 70% copper, 30% zinc alloy.

In addition to all of the heats showing a high degree of grain refinement, in the case of the 80–10–10 alloy the material had a silver sheen instead of its normal copperish color. This indicated an improved dispersement of the lead through the alloy with corresponding improvement in bearing properties.

To further illustrate the invention four heats were made in three of which the titanium cobalt master alloy was added to a copper base beryllium cobalt alloy containing 1.75% beryllium and .3% cobalt so that the heats contained the following percentages of the constituents:

| Heat No. | Ti | Co | Be | Cu |
|---|---|---|---|---|
| A | 0.03 | 0.16 | 1.75 | Bal. |
| B | 0.02 | 0.39 | 1.75 | Bal. |
| C | 0.05 | 0.31 | 1.75 | Bal. |
| D | 0.08 | 0.30 | 1.75 | Bal. |

The four heats set forth were cast into 6″ diameter rounds, each heat being approximately 3,000 pounds.

The grain sizes of the four heats A to D inclusive were as follows: A—coarse; B—coarse; C—fine; D—very fine.

The average size of the grains was .015 inch in the D heat as compared to .125 inch for Heat A.

The preceding tests indicate that along with a given titanium content a given cobalt content must be maintained.

Figure 3:
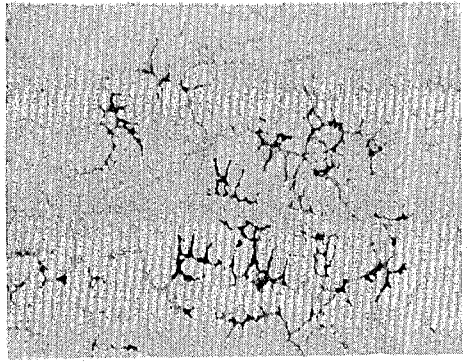
Figure 4:
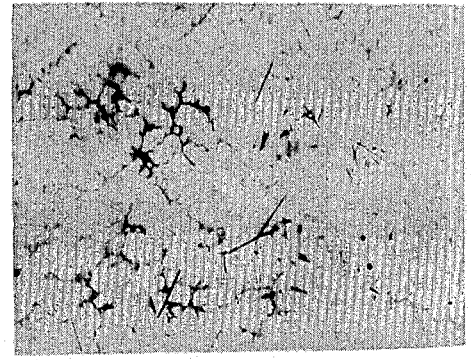
Figure 6:
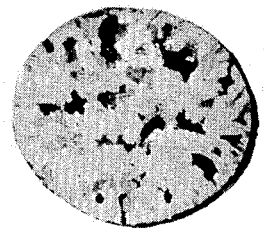
Figure 7:
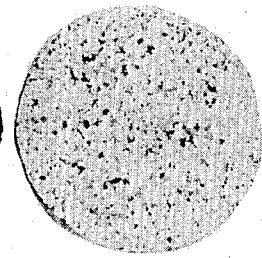
Figure 8:
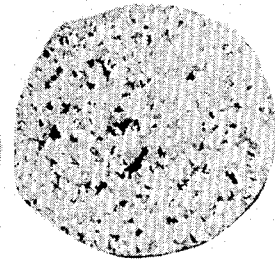
Figure 9:
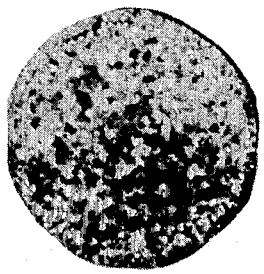
Figure 10:
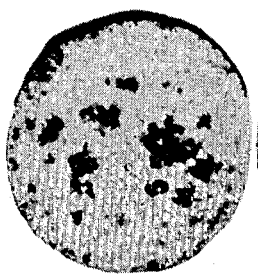
Figure 11:
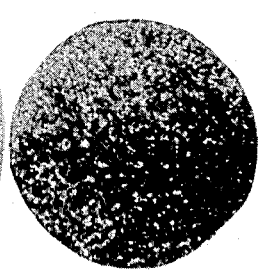
Figure 12:
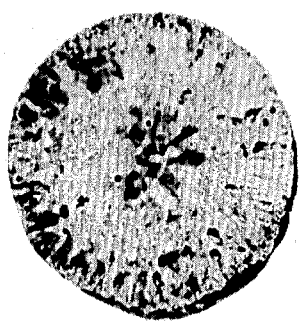
Figure 13:
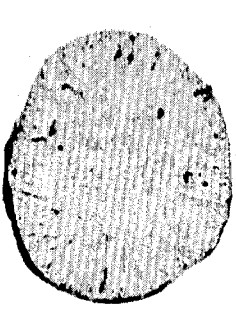
Figure 14:
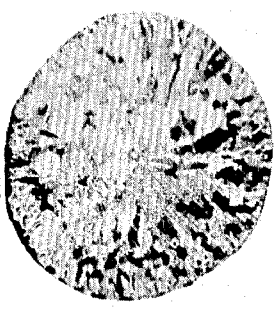
Figure 15:
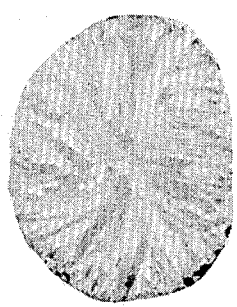
Figure 16:
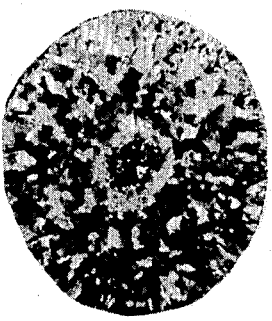
Figure 17:
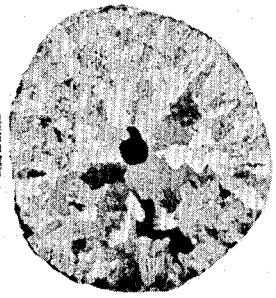
Figure 18:
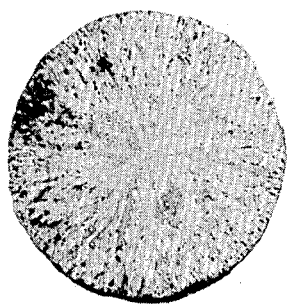
Figure 19:
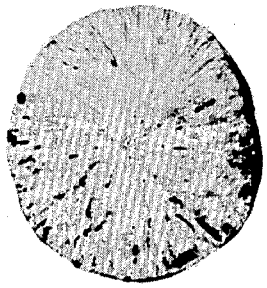
Figure 20:
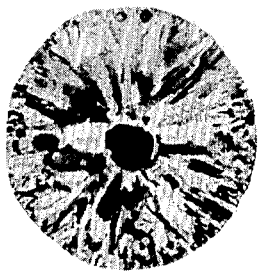
Figure 21:
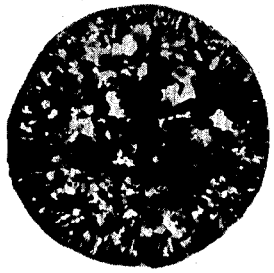
Figure 22:
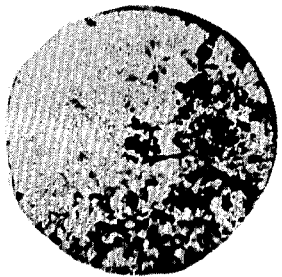
Figure 23:
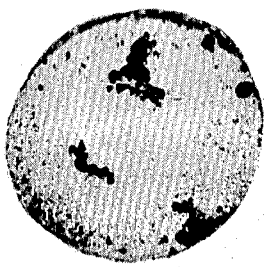
Figure 24:
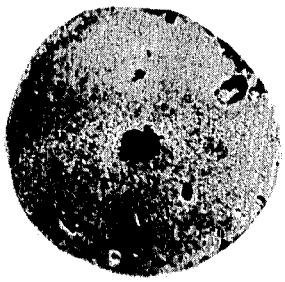
Figure 28:
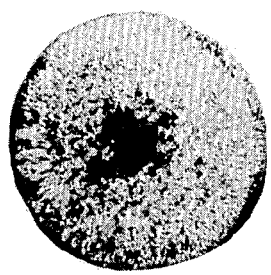
Figure 32:
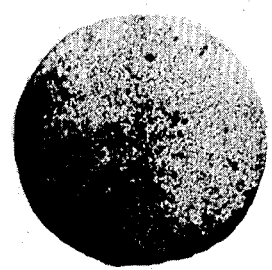
Figure 27:
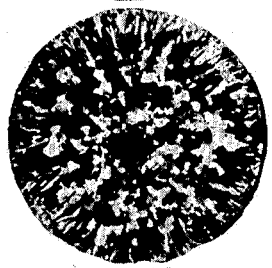
Figure 31:
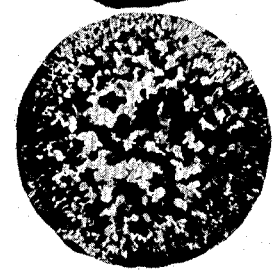
Figure 26:
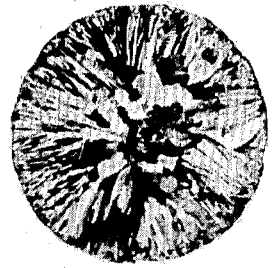
Figure 30:
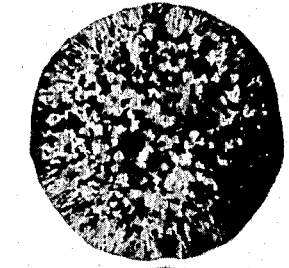
Figure 25:
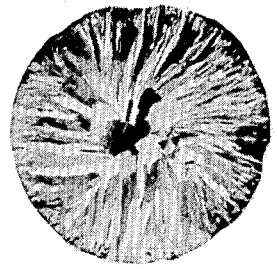
Figure 29:
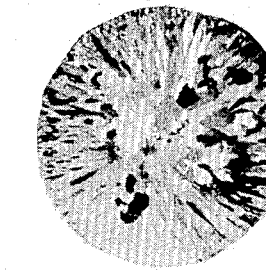
Figure 36:
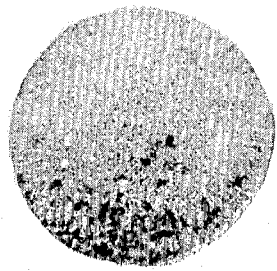
Figure 35:
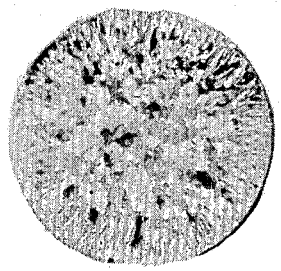
Figure 34:
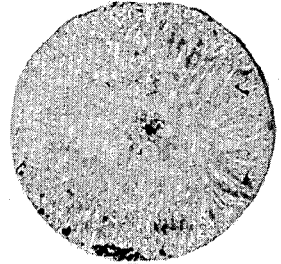
Figure 33:
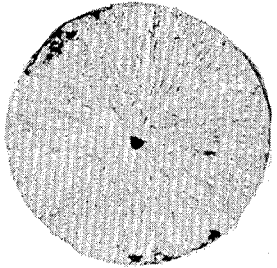
Figure 40:
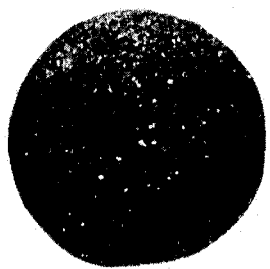
Figure 39:
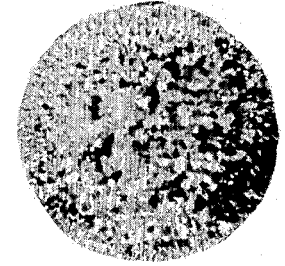
Figure 38:
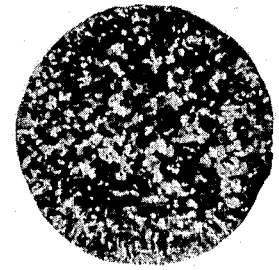
Figure 37:
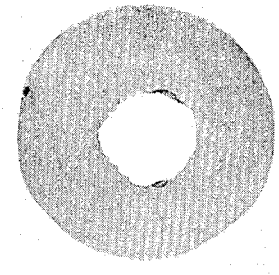

FIG. 3 illustrates the typical microstructure of Heat A. FIGURE 4 illustrates the typical microstructure of Heat D. In the photomicrograph, FIGURE 4, the titanium-cobalt intermetallic phase, present as fine acicular particles, can be noted while in FIGURE 3, they are not present.

As an illustration of the grain refinement achieved by using the hereinbefore referred to intermetallic compounds as nucleating materials, FIGS. 5 to 11 inclusive of the drawings illustrate the grain refining of a beryllium copper alloy containing 2% beryllium. These FIGS. 5 to 11 show the microstructure of billets cast from heats which were identified as 42 to 47a inclusive and as will be seen from the following table, they contained increasing amounts of titanium.

The analysis and composition of these heats are set forth as follows and the heats which were identified by the numerals 42 to 47a correspond respectively with FIGS. 5 to 11 inclusive of the drawing.

The microscopic examination of these heats revealed the presence in the grain refined samples of a phase or intermetallic compound which is missing in heats 42 and 43. X-ray diffraction analysis of these samples indicated the presence of the cobalt-titanium intermetallic compounds $Ti_2Co$, $TiCo_2$ and $TiCo$.

The results shown by the various heats described indicate that cobalt must be present in addition to the titanium and in sufficient quantity to obtain the fine grain structure as will be seen upon reference to the following tables:

Table I

| Heats | Percent Be | Percent Ti | Percent Co | Percent Cu | Grain size | |
|---|---|---|---|---|---|---|
| 30 | 0 | 0 | 1.0 | Bal | Very coarse | Columnar. |
| 31 | 0 | .05 | 1.0 | Bal | do | Do. |
| 32 | 0 | .10 | 1.0 | Bal | do | Do. |
| 33 | 0 | .50 | 1.0 | Bal | do | Do. |
| 34 | 0 | 1.0 | 1.0 | Bal | do | Do. |
| 35 | 0 | 2.0 | 1.0 | Bal | do | Do. |

Upon reference to Table I it will be seen that the heats 30 to 35 show the presence of titanium from .0% to 2.0%. It has been found that where in these heats the cobalt was below its maximum solubility limit in the copper, the desired intermetallic compounds of titanium and cobalt did not form and accordingly the grain size remained coarse as the titanium percentage was increased.

In another series of heats, the cobalt percentage was varied from 0 to 5% and the titanium was maintained at 0.10% as shown in the following Table II.

Table II

| Heats | Percent Be | Percent Ti | Percent Co | Percent Cu | Grain size |
|---|---|---|---|---|---|
| 1 | 0 | .10 | 0 | Bal | Very coarse. |
| 2 | 0 | .10 | .5 | Bal | Do. |
| 3 | 0 | .10 | 1.0 | Bal | Do. |
| 4 | 0 | .10 | 2.0 | Bal | Coarse. |
| 5 | 0 | .10 | 3.0 | Bal | Coarse. |
| 6 | 0 | .10 | 4.0 | Bal | Fine. |
| 7 | 0 | .10 | 5.0 | Bal | Very fine. |

| Heat No. | Percent Be | Percent Co | Percent Ti | Percent Cu | Charge weights, grams | | | |
|---|---|---|---|---|---|---|---|---|
| | | | | | Cu | Be [1] | Co [2] | Ti [3] |
| 42 | 2.0 | 0.30 | 0.0 | Bal | 940 | 1,000 | 60 | 0 |
| 43 | 2.0 | 0.30 | 0.02 | Bal | 940 | 1,000 | 60 | 4 |
| 44 | 2.0 | 0.30 | 0.05 | Bal | 930 | 1,000 | 60 | 10 |
| 45 | 2.0 | 0.30 | 0.15 | Bal | 900 | 1,000 | 60 | 30 |
| 46 | 2.0 | 0.30 | 0.50 | Bal | 840 | 1,000 | 60 | 100 |
| 47 | 2.0 | 0.30 | 1.00 | Bal | 740 | 1,000 | 60 | 200 |
| 47a | 2.0 | 0.30 | 3.00 | Bal | 340 | 1,000 | 60 | 600 |

[1] Be added as 4% master, balance copper.
[2] Co added as 10% master, balance copper.
[3] Ti added as 10% master, balance copper.

In explanation of the foregoing, it will understood that in considering heat 42, 940 grams of copper were taken and to this were added 1000 grams of a master consisting of 4% beryllium and the balance copper and 60 grams of a master consisting of 10% cobalt and the balance copper. No titanium was added to this heat.

Considering another one of the heats, such as 47a, for example, it will be noted that 340 grams of copper were taken to which were added 1000 grams of the 4% beryllium master, 60 grams of the 10% cobalt master and 600 grams of a master consisting of 10% titanium and the balance copper.

Figure 5:
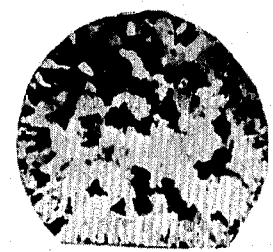

It will be seen upon reference to FIG. 5 of the drawings that the heat 42 which is without titanium is coarse grained.

Heat 43 with a 0.02% titanium is about as coarse-grained as heat 42, but it will be noted that as the percentage of titanium increases from one heat to the next, the grain size decreases. Accordingly, it will be seen that in FIG. 11 the heat 47a shows a highly refined grain structure.

As will be noted, as the percentage of cobalt increases in the several heats as shown, the grain size remains coarse until the 4% cobalt level is reached and then at the 4% cobalt and 5% cobalt level a fine and very fine grain, respectively, was obtained.

The heats set forth in Tables I and II were free of beryllium and the normal solubility of the cobalt in copper was reached in heats No. 6 and 7 and the excess cobalt was then available for combining with the titanium and accordingly the titanium-cobalt intermetallic compounds $Ti_2Co$, $TiCo_2$ and $TiCo$ were formed, providing the nucleating agents to refine the grain.

It is found that in beryllium-copper alloys the addition of beryllium decreases the solubility of the cobalt in the copper. The decrease in solubility of the cobalt is dependent upon the amount of beryllium present, i.e., the greater the beryllium the smaller the cobalt solubility in the alloy. Since this is so, the very fine grain structure can be obtained by adding a smaller amount of cobalt, but still in excess of solubility, to the heat with the addition of 0.1% titanium. For example, for a copper alloy with 0.75% beryllium and a cobalt content in excess of 2.75% cobalt, the grain will be refined by the addition of 0.1% of titanium.

The tests made in accordance with the preceding examples indicate in theory that for grain refinement a minimum range of from 0.02% to 0.20% titanium is required plus cobalt in excess of its solubility in the alloy to refine a copper base alloy. By the expression "excess of its solubility" is here meant an amount of cobalt greater than that which will be dissolved in the base material and sufficiently in excess to react with the titanium to form TiCo, Ti$_2$Co and TiCo$_2$ intermetallic compounds, either singly or in combination.

Accordingly, some copper base alloys will require large additions of cobalt in addition to the 0.02%–0.2% range of titanium in order to obtain the required grain refining while others will be grain refined by the addition of only small amounts of cobalt, such as 0.1%. As an illustration of this, pure copper can be grain refined only after approximately 4% cobalt has been added, in addition to the 0.1% titanium, while for a copper base brass alloy containing 70% copper plus 30% zinc, an addition of 0.1% cobalt plus 0.1% titanium is sufficient to refine the grain.

Referring further to the drawings, FIGS. 12 to 17 show macrostructures of ingots cast from the heats set forth in Table I. Here the various additions of titanium (.05 to 2.0%) to a beryllium free 1.0% cobalt copper base alloy show no grain refining effect. The specimens illustrated in FIGS. 18 to 24 show the macrostructure obtained from the heats of Table II. As shown in the table and also as is evident from the illustrated specimens in FIGS. 18 to 24, the addition of a constant amount of titanium (0.1%) to alloys of various cobalt content (0.0 to 5.0%), with no beryllium present in the copper base alloy, shows a marked decrease in grain size at the 4.0% and 5.0% cobalt content level.

Below is set forth a third table which lists the average values for mechanical properties of solution annealed and aged strip produced from heats of the same composition and exhibiting the same cast grain structure as the heats 42 to 45 and 47 illustrated in FIGS. 5 to 11. These tests were carried out to establish the fact that no deleterious effects would result from the titanium-cobalt addition.

Table III.—Mechanical properties

| Heat No. | Ultimate tens. ($\times 10^3$ p.s.i.) | Yield strength 0.2% offset ($\times 10^3$ p.s.i.) | Proportional limit .002% offset ($\times 10^3$ p.s.i.) | Percent elongation |
| --- | --- | --- | --- | --- |
| 42 | 203.7 | 185.5 | 139.5 | 2.3 |
| 43 | 205.8 | 186.4 | 138.8 | 2.6 |
| 44 | 201.4 | 184.9 | 129.4 | 1.8 |
| 45 | 206.2 | 187.3 | 133.4 | 1.8 |
| 47 | 197.1 | 178.9 | 126.5 | 1.8 |

Base alloy 25: 190.0 to 205.0; 165.0 to 195.0; 125.0 to 155.0; 1 to 3 (Specification limits).

The heats 42 to 45 and 47 were cast in one inch by three and one-half inch slabs which weighed approximately 10 pounds. These ingots were hot rolled to 0.130 inch thickness and then cold rolled to produce the H temper at .018 inch gauge. Standard rolling and annealing practices were followed. All of the heats were aged for two hours at 600° F. to produce the HT temper. The last line of Table III lists the normal specification limits for the mechanical properties of the base alloy hereinbefore set forth, taken as a standard, and which consists of 2.0% beryllium, 0.3% cobalt and the balance copper. The property levels of all heats containing titanium additions fall within the respective ranges for this base or standard alloy. The results from heat No. 47 (1.0% Ti) indicate a slight decrease in the strength levels but they are still well above the minimum requirements.

In addition to the standard or base alloy hereinbefore referred to, a series of heats representing different standard copper base alloys were prepared.

The following Table IV lists the compositions of these alloys.

Table IV.—Nominal chemical analysis

| Heat No. | Percent | | | | | | | | |
| --- | --- | --- | --- | --- | --- | --- | --- | --- | --- |
| | Cu | Zn | Pb | Sn | Al | P | Be [1] | Ti [1] | Co [1] |
| 48 | 85.0 | 15.0 | | | | | 0.10 | 0.10 | 0.10 |
| 49 | 70.0 | 30.0 | | | | | 0.10 | 0.10 | 0.10 |
| 50 | 60.0 | 39.25 | | 0.75 | | | 0.10 | 0.10 | 0.10 |
| 51 | 92.0 | | | 8.0 | | 0.25 | 0.10 | 0.10 | 0.10 |
| 52 | 90.0 | | | | 10.0 | | 0.10 | 0.10 | 0.10 |
| 53 | 85.0 | 5.0 | 5.0 | 5.0 | | | 0.10 | 0.10 | 0.10 |
| 54 | 88.0 | 2.0 | | 10.0 | | | 0.10 | 0.10 | 0.10 |
| 55 | 80.0 | | 10.0 | 10.0 | | | 0.10 | 0.10 | 0.10 |

[1] Present in second half of each heat only.

A 4000 gm. heat was produced for each alloy and one-half of each heat was cast. The other half of each heat had added to it prior to casting a copper base master alloy of beryllium, copper, titanium and cobalt, such as that hereinbefore set forth, so as to produce a final analysis of 0.10% beryllium, 0.10% titanium, and 0.10% cobalt in the second half of each heat. In all cases, the same pouring temperature was used for both halves of each heat.

FIGS. 25 to 40 of the drawings show the macrostructure of the two-inch diameter ingots cast from these heats. The A samples represent the standard alloy and the B samples represent the same alloy with the combined titanium, beryllium and cobalt addition.

As is clearly shown from the reproduced photographs of the samples illustrated in FIGS. 25 to 40, the ingots containing the addition showed, in all cases, a finer grain size than those which did not contain the addition. It is to be noted also that the columnar grain structure of the ingot at the surface is reduced or eliminated.

In addition to the improved macrostructure, it was noted that the surface condition of the ingots containing the addition was superior in each instance to those without the addition.

The addition also reduced the amount of surface oxidation and produced an ingot with a bright surface. The A samples, in all cases, which did not have the addition of the beryllium, titanium and cobalt to the alloy, were seen to be heavily oxidized. Another effect which was noted was that heats 49 and 50, which are high in zinc, showed an absence of zinc oxide film on the head of the ingot B, containing the beryllium, titanium and cobalt addition. The titanium and cobalt present in the addition have produced the refined grain structure in the B ingots of these heats.

Another important effect produced in associaton with the addition of titanium, beryllium and cobalt is that the beryllium reduces the amount of surface oxidation by creating a protective film of beryllium oxide on the ingot surface. In the pouring of an ingot the hot metal and the mold material many times interact to form gases which produce subcutaneous porosity within the ingot. The addition of the beryllium to the alloy substantially eliminates this problem of porosity by forming a thin film of beryllium oxide on the surface of the ingot. This film forms a tough barrier layer to prevent the gases from diffusing into the metal and thus adversely affecting the ingot.

It is now possible by this invention to produce copper base castings and billets which may be solution annealed and aged without cracking.

The addition of titanium and cobalt to copper base alloys and in particular to beryllium copper alloys, produced the new and unexpected result of creating intermetallic compounds when the cobalt is in an amount in excess of its solubility in the alloy, which compounds provide a large number of nuclei dispersed through the melt to initiate the formation in the melt of the desirable fine grain structure.

As this invention may be embodied in several forms without departing from the spirit or essential characteristics thereof, the present embodiment is therefore illustrative and not restrictive, since the scope of the invention is defined in the appended claims, and all changes that fall within the metes and bounds of the claims, or that form their functional as well as conjointly cooperative equivalents, are therefore intended to be embraced by those claims.

We claim:

1. A copper base alloy containing as additives to the alloy titanium and cobalt, wherein the titanium is in the minimum range of from 0.02% to 0.20% and the cobalt is in the range of from about 0.1% to about 5% in an amount effective to react with the titanium to form at least one of the group consisting of $TiCo$, $Ti_2Co$ and $TiCo_2$ intermetallic compounds to produce a fine grain structure.

2. The copper base alloy of claim 1 wherein the average grain size is about 0.015 inch.

3. The method of producing a fine grain copper base alloy which comprises adding to a copper base alloy titanium in the minimum range of from about 0.02% to about 0.20% and cobalt in the range of from about 0.1% to about 5% in an amount effective to react with the titanium to form and precipitate out of solution during solidification of the alloy intermetallic compounds of titanium and cobalt to provide nuclei to initiate the fine grain formation.

4. An alloy consisting of about .10% titanium, .10% cobalt, .10% beryllium, 30% zinc with the balance essentially copper.

5. An alloy consisting of about .10% titanium, .10% cobalt, .10% beryllium, 5% tin, 5% zinc, 5% lead and balance essentially copper.

6. An alloy consisting of about .10% titanium, .10% cobalt, .10% beryllium, 11% aluminum, 4% iron and the balance essentially copper.

7. An alloy consisting of about .10% titanium, .10% cobalt, .10% beryllium, 10% tin, 10% lead and the balance essentially copper.

8. An alloy consisting of about 2% beryllium, .30% cobalt, 0.02% to 3% titanium, and the balance essentially copper.

9. An alloy consisting of approximately .10% titanium, 4% to 5% cobalt, with the balance essentially copper.

10. A 70% copper and 30% zinc alloy to which has been added 0.1% titanium and 0.1% cobalt.

References Cited by the Examiner
UNITED STATES PATENTS

| | | | |
|---|---|---|---|
| 2,137,282 | 11/38 | Hensel et al. | 75—159 |
| 2,137,283 | 11/38 | Hensel et al. | 75—159 |
| 2,169,190 | 8/39 | Kelly | 75—153 |
| 2,482,423 | 9/49 | Malcolm | 75—164 |
| 2,554,233 | 5/51 | Ballentine et al. | 75—164 X |
| 2,667,431 | 1/54 | Burnside | 75—153 |
| 2,752,242 | 6/56 | Holzworth | 75—164 X |
| 2,783,143 | 2/57 | Johnson et al. | 75—164 X |

OTHER REFERENCES

Hansen: "Constitution of Binary Alloys," McGraw-Hill Book Company, Inc., New York, 1958, pages 486, 512, 523, 1051, 1062, and 1245.

DAVID L. RECK, *Primary Examiner.*

RAY K. WINDHAM, *Examiner.*